United States Patent
Watanabe et al.

(10) Patent No.: US 9,455,444 B2
(45) Date of Patent: *Sep. 27, 2016

(54) LITHIUM COMPOSITE COMPOUND PARTICLES AND PROCESS FOR PRODUCING THE SAME, AND NON-AQUEOUS ELECTROLYTE SECONDARY BATTERY

(75) Inventors: Hiroyasu Watanabe, Fukuoka-ken (JP);
Taiki Imahashi, Fukuoka-ken (JP);
Kazuhiko Kikuya, Fukuoka-ken (JP);
Nobuyuki Tagami, Fukuoka-ken (JP);
Hideaki Sadamura, Fukuoka-ken (JP)

(73) Assignee: TODA KOGYO CORPORATION, Hiroshima (JP)

(*) Notice: Subject to any disclaimer, the term of this patent is extended or adjusted under 35 U.S.C. 154(b) by 930 days.

This patent is subject to a terminal disclaimer.

(21) Appl. No.: 13/132,495

(22) PCT Filed: Dec. 3, 2009

(86) PCT No.: PCT/JP2009/006602
§ 371 (c)(1),
(2), (4) Date: Aug. 2, 2011

(87) PCT Pub. No.: WO2010/064440
PCT Pub. Date: Jun. 10, 2010

(65) Prior Publication Data
US 2011/0281168 A1    Nov. 17, 2011

(30) Foreign Application Priority Data
Dec. 4, 2008  (JP) .................... 2008-310166

(51) Int. Cl.
*H01M 4/525*   (2010.01)
*C01G 53/00*   (2006.01)
(Continued)

(52) U.S. Cl.
CPC .............. *H01M 4/525* (2013.01); *C01G 53/42* (2013.01); *C01P 2002/52* (2013.01);
(Continued)

(58) Field of Classification Search
USPC ................................................ 429/223, 489
See application file for complete search history.

(56) References Cited

U.S. PATENT DOCUMENTS 5,264,201 A   11/1993  Dahn et al.
2004/0161668 A1  8/2004  Maeda et al.
(Continued)

FOREIGN PATENT DOCUMENTS

JP   6-342657    12/1994
JP   09-231963    9/1997
(Continued)

OTHER PUBLICATIONS

JP2003-017054A English Machine Translation.*
(Continued)

*Primary Examiner* — Lucas J O Donnell
(74) *Attorney, Agent, or Firm* — Nixon & Vanderhye P.C.

(57) ABSTRACT

The present invention relates to lithium composite compound particles having a composition represented by the formula: $Li_{1+x}Ni_{1-y-z}Co_yM_zO_2$ (M=B or Al), wherein the lithium composite compound particles have an ionic strength ratio A ($LiO^-/NiO_2^-$) of not more than 0.3 and an ionic strength ratio B ($Li_3CO_3^+/Ni^+$) of not more than 20 as measured on a surface of the respective lithium composite compound particles using a time-of-flight secondary ion mass spectrometer. The lithium composite compound particles of the present invention can be used as a positive electrode active substance of a secondary battery which has good cycle characteristics and an excellent high-temperature storage property.

2 Claims, 2 Drawing Sheets

(51) Int. Cl.
  *H01M 4/1391* (2010.01)
  *H01M 10/052* (2010.01)
  *H01M 10/0566* (2010.01)

(52) U.S. Cl.
  CPC ...... *C01P 2002/72* (2013.01); *C01P 2004/04* (2013.01); *C01P 2004/61* (2013.01); *C01P 2006/12* (2013.01); *C01P 2006/40* (2013.01); *C01P 2006/80* (2013.01); *H01M 4/1391* (2013.01); *H01M 10/052* (2013.01); *H01M 10/0566* (2013.01); *Y02E 60/122* (2013.01); *Y02P 70/54* (2015.11)

(56) References Cited

U.S. PATENT DOCUMENTS

| | | |
|---|---|---|
| 2006/0286457 A1 | 12/2006 | Sasaki |
| 2007/0231694 A1 | 10/2007 | Abe et al. |
| 2008/0254368 A1 | 10/2008 | Ooyama et al. |
| 2009/0152457 A1 | 6/2009 | Niehuis et al. |
| 2009/0200509 A1 | 8/2009 | Suzuki et al. |
| 2013/0119307 A1* | 5/2013 | Watanabe et al. ......... 252/182.1 |

FOREIGN PATENT DOCUMENTS

| | | |
|---|---|---|
| JP | 10-162830 | 6/1998 |
| JP | 11-219706 | 8/1999 |
| JP | 11-354118 | 12/1999 |
| JP | 2000-260479 | 9/2000 |
| JP | 2000-327339 | 11/2000 |
| JP | 2003-017054 | 1/2003 |
| JP | 2003-123755 | 4/2003 |
| JP | 2004-171961 | 6/2004 |
| JP | 2004-327246 | 11/2004 |
| JP | 2007-091573 | 4/2007 |
| JP | 2007-242288 | 9/2007 |
| JP | 2007-265731 | 10/2007 |
| JP | 2007-273106 | 10/2007 |
| JP | 2007-273108 | 10/2007 |
| JP | 2008-251434 | 10/2008 |

OTHER PUBLICATIONS

JP2007-091573A English Machine Translation.*
English translation of Notice of Reasons for Rejection in JP 2009-275867 mailed Dec. 4, 2013.
Partial English translation of "Analysis of organic metal complex by TOF-SIMS", Shishido et al.
Ota et al; "XAFS and TOF-SIMS analysis of SEI layers on electrodes", Journal of Power Sources 119-121 (2003) 567-571.
International Search Report for PCT/JP2009/006602, mailed Mar. 9, 2010.
Takami et al., "Laminated Thin Li-Ion Batteries Using $LiNi_{0.8}$—$Co_{0.2}$ $Al_yO_2$," Corporate Research & Development Center, Toshiba Corporation, May 27, 2003, 6 pages.
Extended European Search Report issued in European Application No. 09830210 dated Apr. 8, 2015.
Kim et al., "Washing Effect of a $LiNi_{0.83}Co_{0.15}Al_{0.02}O_2$ Cathode in Water," Electrochemical Society 9(1), 2006, 5 pages.

* cited by examiner though being deteriorated in their characteristics to improve
LITHIUM COMPOSITE COMPOUND PARTICLES AND PROCESS FOR PRODUCING THE SAME, AND NON-AQUEOUS ELECTROLYTE SECONDARY BATTERY This application is the U.S. national phase of International Application No. PCT/JP2009/006602 filed 3 Dec. 2009, which designated the U.S. and claims priority to Japan Application No. 2008-310166 filed 4 Dec. 2008, the entire contents of each of which are hereby incorporated by reference.

TECHNICAL FIELD

The present invention relates to lithium composite compound particles which are capable of exhibiting good cycle characteristics and an excellent high-temperature storage property when used as a positive electrode (cathode) active substance of secondary batteries, and a secondary battery using the lithium composite compound particles.

BACKGROUND ART

With the recent rapid development of portable and cordless electronic devices such as audio-visual (AV) devices and personal computers, there is an increasing demand for secondary batteries or cells having a small size, a light weight and a high energy density as a power source for driving these electronic devices. Also, in consideration of global environments, electric cars and hybrid cars have been recently developed and put into practice, so that there is an increasing demand for lithium ion secondary batteries for large size applications having excellent storage characteristics. Under these circumstances, the lithium ion secondary batteries having advantages such as a large charge/discharge capacity and good storage characteristics have been noticed.

Hitherto, as positive electrode active substances useful for high energy-type lithium ion secondary batteries having a 4 V-grade voltage, there are generally known $LiMn_2O_4$ having a spinel structure, $LiMnO_2$ having a zigzag layer structure, $LiCoO_2$ and $LiNiO_2$ having a layer rock-salt structure, or the like. Among these secondary batteries using these active substances, lithium ion secondary batteries using $LiNiO_2$ have been noticed because they have a large charge/discharge capacity thereof. However, these materials tend to be deteriorated in thermal stability upon charging and charge/discharge cycle durability, and, therefore, it has been required to further improve properties thereof.

One of factors causing deterioration of characteristics of the positive electrode active substances is considered to reside in impurities which are present on the surface of the respective particles. That is, when an excess amount of lithium is present on the surface of the particles upon synthesis thereof, undesirable gelation tends to be caused when forming an electrode therefrom. In addition, when the excess amount of lithium is subjected to carbonation, generation of a carbon dioxide gas tends to be undesirably caused owing to a reaction within the battery, so that the battery tends to suffer from swelling, resulting in deteriorated characteristics of the battery. Further, if sulfates or the like are present on the particles, undesirable increase in resistance value of the battery tends to be caused upon storage.

To solve the above conventional problems, it has been strongly required that the amount of impurities which are present on the surface of the particles is reduced to control the surface condition of the particles, so that side reactions within the battery upon charging and discharging are suppressed, and the particles and the electrode are prevented from being deteriorated in their characteristics to improve cycle characteristics and high-temperature storage property of the resulting battery.

Conventionally, for the purpose of improving various characteristics of the secondary battery, there are known the techniques for improving a capacity of the secondary battery (Patent Documents 1 to 7), the techniques for improving cycle characteristics of the secondary battery (Patent Documents 8 to 10), the techniques for improving a storage property of the secondary battery (Patent Documents 3 and 11), and the techniques for improving a thermal stability of the secondary battery (Patent Documents 5 to 7 and 12) or the like.

Patent Document 1: Japanese Patent Application Laid-open (KOKAI) No. 3-64860
Patent Document 2: Japanese Patent Application Laid-open (KOKAI) No. 9-259879
Patent Document 3: Japanese Patent Application Laid-open (KOKAI) No. 2003-17054
Patent Document 4: Japanese Patent Application Laid-open (KOKAI) No. 2004-171961
Patent Document 5: Japanese Patent Application Laid-open (KOKAI) No. 2007-273106
Patent Document 6: Japanese Patent Application Laid-open (KOKAI) No. 2008-117729
Patent Document 7: Japanese Patent Application Laid-open (KOKAI) No. 2008-198363
Patent Document 8: Japanese Patent Application Laid-open (KOKAI) No. 4-328277
Patent Document 9: Japanese Patent Application Laid-open (KOKAI) No. 8-138669
Patent Document 10: Japanese Patent Application Laid-open (KOKAI) No. 9-17430
Patent Document 11: Japanese Patent Application Laid-open (KOKAI) No. 9-231963
Patent Document 12: Japanese Patent Application Laid-open (KOKAI) No. 2007-273108

DISCLOSURE OF THE INVENTION

Problem to be Solved by the Invention

At present, it has been strongly required to provide a positive electrode (cathode) active substance capable of fulfilling the above properties. However, such a positive electrode active substance has not been obtained until now.

That is, it has been attempted to improve a capacity, cycle characteristics, a storage property and a thermal stability of the secondary battery by washing particles as the positive electrode active substance with water and reducing an amount of impurities which are present on the surface thereof.

In the above method in which excessive lithium is washed out from the surface of the particles, it will be expected to improve a coatability of the particles and suppress occurrence of side reactions within the secondary battery.

However, when the water-washing conditions are inadequate, lithium tends to be released from an inside of the positive electrode active substance, so that an inherent crystal structure thereof tends to be broken, and the resulting secondary battery tends to be deteriorated in cycle characteristics.

Under these circumstances, an object of the present invention is to provide lithium composite compound particles as a positive electrode active substance which are well controlled in a crystal structure and amount of impurities present on the surface of the respective particles so as to improve cycle characteristics and a storage property of a secondary battery produced using the particles.

Means for Solving the Problem

The above object and technical task can be achieved by the following aspects of the present invention.

That is, according to the present invention, there are provided lithium composite compound particles comprising a lithium composite compound represented by the following compositional formula 1, which lithium composite compound particles have an ionic strength ratio A ($LiO^-/NiO_2^-$) of not more than 0.3 and an ionic strength ratio B ($Li_3CO_3^+/Ni^+$) of not more than 20 as measured on a surface of the respective lithium composite compound particles using a time-of-flight secondary ion mass spectrometer (Invention 1):

$$Li_{1+x}Ni_{1-y-z}Co_yM_zO_2 \qquad \text{Compositional formula 1}$$

wherein M is at least one element selected from the group consisting of B and Al; and x, y and z satisfy $-0.02 \le x \le 0.02$, $0 < y \le 0.20$ and $0 < z \le 0.10$, respectively.

Also, according to the present invention, there are provided the lithium composite compound particles as described in the above Invention 1, wherein the lithium composite compound particles have an average secondary particle diameter of 1 to 30 μm (Invention 2).

Also, according to the present invention, there are provided the lithium composite compound particles as described in the above Invention 1 or 2, wherein the lithium composite compound particles have a powder pH value of not more than 11.0 as measured in a 2% by weight suspension prepared by dispersing the lithium composite compound particles in water (Invention 3).

Also, according to the present invention, there are provided the lithium composite compound particles as described in any one of the above Inventions 1 to 3, wherein the lithium composite compound particles have a carbon content of not more than 300 ppm (Invention 4).

Also, according to the present invention, there are provided the lithium composite compound particles as described in any one of the above Inventions 1 to 4, wherein the lithium composite compound particles have a sulfur content of not more than 100 ppm, an ionic strength ratio C ($LiSO_3^-/NiO_2^-$) of not more than 0.3 and a sodium content of not more than 100 ppm (Invention 5).

Also, according to the present invention, there are provided the lithium composite compound particles as described in any one of the above Inventions 1 to 5, wherein the lithium composite compound particles have a lithium carbonate component content of not more than 0.30% by weight and a lithium hydroxide content of not more than 0.30% by weight (Invention 6).

Also, according to the present invention, there are provided the lithium composite compound particles as described in any one of the above Inventions 1 to 6, wherein the lithium composite compound particles have a specific surface area of 0.05 to 0.7 m²/g (Invention 7).

In addition, according to the present invention, there is provided a process for producing the lithium composite compound particles as described in any one of the above Inventions 1 to 7, comprising the steps of (1) treating lithium composite compound particles with a water solvent to remove impurities therefrom; and (2) subjecting the lithium composite compound particles obtained in the step (1) to heat treatment, a ratio of a total molar amount of lithium to a total molar amount of a transition element, aluminum and boron in the lithium composite compound particles used in the step (1) being not less than 1.02 and not more than 1.10 (Invention 8).

Also, according to the present invention, there is provided the process as described in the above Invention 8, wherein the heat treatment in the step (2) is conducted in a temperature range of 500 to 850° C. in an air or oxygen atmosphere having a carbonate concentration of not more than 100 ppm (Invention 9).

Further, according to the present invention, there is provided a non-aqueous electrolyte secondary battery comprising the lithium composite compound particles as described in any one of the above Inventions 1 to 7 (Invention 10).

Effect of the Invention

The lithium composite compound particles of the present invention are excellent in cycle characteristics and high-temperature storage property when used as a positive electrode active substance of a secondary battery, and therefore can be suitably used as a positive electrode active substance of a secondary battery.

PREFERRED EMBODIMENTS FOR CARRYING OUT THE INVENTION

The construction of the present invention is described in detail below.

First, the lithium composite compound particles according to the present invention are described.

The lithium composite compound particles according to the present invention have a composition represented by the following compositional formula 1:

$$Li_{1+x}Ni_{1-y-z}Co_yM_zO_2 \qquad \text{Compositional formula 1}$$

wherein M is at least one element selected from the group consisting of B and Al; and x, y and z satisfy $-0.02 \le x \le 0.02$, $0 < y \le 0.20$ and $0 < z \le 0.10$, respectively.

The suffixes x, y and z are more preferably $-0.015 \le x \le 0.015$, $0.001 \le y \le 0.18$ and $0.001 \le z \le 0.09$, respectively, and still more preferably $-0.01 \le x \le 0.01$, $0.01 \le y \le 0.15$ and $0.01 \le z \le 0.08$, respectively.

The lithium composite compound particles according to the present invention have an ionic strength ratio A ($LiO^-/NiO_2^-$) of not more than 0.3 as measured on a surface of the respective lithium composite compound particles using a time-of-flight secondary ion mass spectrometer. When the ionic strength ratio A ($LiO^-/NiO_2^-$) of the lithium composite compound particles is more than 0.3, the secondary battery produced using the lithium composite compound particles tends to be deteriorated in cycle characteristics. The ionic strength ratio A ($LiO^-/NiO_2^-$) of the lithium composite compound particles is preferably 0.01 to 0.25.

The lithium composite compound particles according to the present invention have an ionic strength ratio B ($Li_3CO_3^+/Ni^+$) of not more than 20 as measured on a surface of the respective lithium composite compound particles using a time-of-flight secondary ion mass spectrometer. When the ionic strength ratio B ($Li_3CO_3^+/Ni^+$) of the lithium composite compound particles is more than 20, the secondary battery produced using the lithium composite compound particles tends to be deteriorated in cycle characteristics. The ionic strength ratio B ($Li_3CO_3^+/Ni^+$) of the lithium composite compound particles is preferably 0.1 to 19.0.

The lithium composite compound particles according to the present invention preferably have an ionic strength ratio C ($LiSO_3^-/NiO_2^-$) of not more than 0.3 as measured on a surface of the respective lithium composite compound particles using a time-of-flight secondary ion mass spectrometer. When the ionic strength ratio C ($LiSO_3^-/NiO_2^-$) of the lithium composite compound particles is more than 0.3, the secondary battery produced using the lithium composite compound particles tends to be deteriorated in storage property. The ionic strength ratio C ($LiSO_3^-/NiO_2^-$) of the lithium composite compound particles is more preferably 0.01 to 0.25.

The lithium composite compound particles according to the present invention preferably have an average secondary particle diameter of 1.0 to 30 μm. When the average secondary particle diameter of the lithium composite compound particles is less than 1.0 μm, the resulting particles tend to be undesirably lowered in packing density or increased in reactivity with an electrolyte solution. When the average secondary particle diameter of the lithium composite compound particles is more than 30 μm, the resulting particles tend to be deteriorated in conductivity owing to increase in diffusion distance of lithium ions, and the secondary battery produced using the particles tends to be deteriorated in cycle characteristics, thereby failing to attain the aimed effects of the present invention. The average secondary particle diameter of the lithium composite compound particles is more preferably 2.0 to 20 μm.

The lithium composite compound particles according to the present invention preferably have an average primary particle diameter of not less than 0.1 μm. When the average primary particle diameter of the lithium composite compound particles is less than 0.1 μm, the resulting particles tend to be deteriorated in crystallizability, also resulting in deteriorated cycle characteristics of the secondary battery produced using the particles. When the average primary particle diameter of the lithium composite compound particles is more than 15 μm, the resulting particles tend to suffer from poor diffusion of lithium therein, so that the secondary battery produced using the particles also tends to be deteriorated in cycle characteristics. The average primary particle diameter of the lithium composite compound particles is more preferably 0.1 to 15 μm and still more preferably 0.5 to 12 μm.

The lithium composite compound particles according to the present invention preferably have a powder pH value (a pH value of water in which the particles are dispersed) of not more than 11.0. When the powder pH value of the lithium composite compound particles is more than 11.0, the positive electrode obtained therefrom tends to be deteriorated in coatability, and the secondary battery produced using the particles also tends to be deteriorated in cycle characteristics and storage property. The powder pH value of the lithium composite compound particles is more preferably not more than 10.8 and still more preferably not more than 10.7. Meanwhile, the lower limit of the powder pH value of the lithium composite compound particles is usually 9.0.

The lithium composite compound particles according to the present invention preferably have a carbon content of not more than 300 ppm. When the carbon content of the lithium composite compound particles is more than 300 ppm, the secondary battery produced using the lithium composite compound particles tends to be deteriorated in cycle characteristics. The carbon content of the lithium composite compound particles is more preferably 1.0 to 250 ppm.

The lithium composite compound particles according to the present invention preferably have a sulfur content of not more than 100 ppm. When the sulfur content of the lithium composite compound particles is more than 100 ppm, the secondary battery produced using the lithium composite compound particles tends to be deteriorated in storage property. The sulfur content of the lithium composite compound particles is more preferably not more than 50 ppm.

The lithium composite compound particles according to the present invention preferably have a sodium content of not more than 100 ppm. When the sodium content of the lithium composite compound particles is more than 100 ppm, the secondary battery produced using the lithium composite compound particles tends to be deteriorated in cycle characteristics. The sodium content of the lithium composite compound particles is more preferably not more than 50 ppm.

The lithium composite compound particles according to the present invention preferably have a lithium carbonate component content of not more than 0.30% by weight. When the lithium carbonate content of the lithium composite compound particles is more than 0.30% by weight, the secondary battery produced using the lithium composite compound particles tends to be deteriorated in cycle characteristics owing to occurrence of side reactions and generation of gases within the secondary battery. The lithium carbonate content of the lithium composite compound particles is more preferably not more than 0.25% by weight.

The lithium composite compound particles according to the present invention preferably have a lithium hydroxide content of not more than 0.30% by weight. When the lithium hydroxide content of the lithium composite compound particles is more than 0.30% by weight, the positive electrode obtained from the lithium composite compound particles tends to be deteriorated in coatability, and the secondary battery produced using the lithium composite compound particles tends to be deteriorated in cycle characteristics. The lithium hydroxide content of the lithium composite compound particles is more preferably not more than 0.20% by weight.

The lithium composite compound particles according to the present invention preferably have a BET specific surface area of 0.05 to 0.7 $m^2/g$. When the BET specific surface area of the lithium composite compound particles is less than 0.05 $m^2/g$, the secondary battery produced using the lithium composite compound particles tends to be deteriorated in cycle characteristics. When the BET specific surface area of the lithium composite compound particles is more than 0.7 $m^2/g$, the secondary battery produced using the lithium composite compound particles tends to be deteriorated in storage property. The BET specific surface area of the lithium composite compound particles is more preferably 0.06 to 0.6 $m^2/g$.

Next, the process for producing the lithium composite compound particles according to the present invention is described.

The lithium composite compound particles according to the present invention can be produced by conducting the step (1) of deaggregating lithium composite compound particles previously prepared and then dispersing the thus deaggregated lithium composite compound particles in water to wash the particles with the water, thereby removing impurities therefrom; and the step (2) of subjecting the lithium composite compound particles obtained in the step (1) to drying and then to heat treatment in a temperature range of 500 to 850° C. in atmospheric air having a carbonate concentration of not more than 100 ppm or in oxygen having a carbonate concentration of not more than 100 ppm.

In the present invention, the lithium composite compound particles to be initially treated in the above process may be produced by an ordinary method. For example, the lithium composite compound particles may be produced by any of the method in which a lithium compound, a nickel compound, a cobalt compound, an aluminum compound and/or a boron compound are mixed with each other, and then the resulting mixture is subjected to heat treatment to thereby obtain the lithium composite compound particles as aimed; the method in which a composite compound comprising nickel, cobalt, aluminum and/or boron is previously formed and then mixed with a lithium compound, and the resulting mixture is subjected to heat treatment; and the method in which a lithium compound, a nickel compound, a cobalt compound, an aluminum compound and/or a boron compound are reacted with each other in a solution thereof.

Meanwhile, the lithium composite compound particles to be initially treated preferably have a ratio of a total molar amount of lithium to a total molar amount of a transition element (such as Co and Ni), aluminum and boron (Li/(Co+Ni+Al+B)) of not less than 1.02 and not more than 1.10. When the above ratio is less than 1.02, the resulting lithium composite compound particles tend to be deteriorated in capacity owing to an insufficient reaction between these elements. When the above ratio is more than 1.10, an excess amount of lithium tends to undesirably remain as a residue. The ratio (Li/(Co+Ni+Al+B)) in the lithium composite compound particles is more preferably 1.03 to 1.08.

In the present invention, the lithium composite compound particles are preferably subjected to deaggregation before being washed with water.

In the present invention, the lithium composite compound particles are suspended in deionized water which is used in an amount not less than 5 times an amount of the lithium composite compound particles in terms of a weight ratio therebetween and maintained at a temperature of not higher than 20° C., over about 20 min, and the resulting suspension is filtered and then washed with flowing deionized water which is used in the same amount as that used upon the suspension. The suspension time is preferably within 30 min.

The lithium composite compound particles thus washed with water are subjected to filtration, drying and then heat treatment. When the amount of deionized water used for the washing is too small, the washing of the lithium composite compound particles tends to be insufficient. When the suspension time is too long, the productivity of the lithium composite compound particles tends to be undesirably lowered, and further Li tends to be undesirably released from crystals of the particles. When the temperature of deionized water used for the water-washing is too high, release of Li from the particles tends to occur very early, so that when the particles are washed with water to remove a surplus amount of Li therefrom, an additional amount of Li tends to be simultaneously released from crystals thereof. Therefore, it may be difficult to well control the composition of the resulting particles. As a result of considering the above viewpoints, the water-washing is preferably conducted using deionized water having a temperature of not higher than 20° C. and preferably not higher than 10° C. within 20 min.

In order to stabilize a crystallinity of the surface of the respective particles, it is required to subject the lithium composite compound particles to heat treatment. The heat treatment temperature is 500 to 850° C. When the heat treatment temperature is lower than 500° C., the secondary battery produced using the resulting lithium composite compound particles tends to be deteriorated in storage property. When the heat treatment temperature is higher than 850° C., the secondary battery produced using the resulting lithium composite compound particles tends to be deteriorated in cycle characteristics. The heat treatment temperature is preferably 600 to 800° C.

The holding time in the heat treatment is preferably 1 to 5 hr. When the holding time is shorter than 1 hr, the crystallinity of the surface of the respective particles tends to be insufficient. When the holding time is longer than 5 hr, the balance between productivity and costs tends to become deteriorated.

The atmosphere used in the heat treatment is either air having a carbonate concentration of not more than 100 ppm or oxygen having a carbonate concentration of not more than 100 ppm. When the carbonate concentration in the atmosphere is more than 100 ppm, the secondary battery produced using the resulting lithium composite compound particles tends to be deteriorated in cycle characteristics. In addition, in a reducing atmosphere such as nitrogen, release of oxygen tends to be undesirably caused upon the heat treatment.

According to the above production process, it is possible to attain the ionic strength ratio A ($LiO^-/NiO_2^-$), the ionic strength ratio B ($Li_3CO_3^+/Ni^+$), the powder pH value, the carbon content, the sulfur content, the ionic strength ratio C ($LiSO_3^-/NiO_2^-$), the sodium content, the lithium carbonate component content and the lithium hydroxide content as defined in the present invention.

Next, a positive electrode using the positive electrode active substance comprising the lithium composite compound particles according to the present invention is described.

When producing the positive electrode using the positive electrode active substance according to the present invention, a conducting agent and a binder are added to the lithium composite compound particles by an ordinary method. Examples of the preferred conducting agent include acetylene black, carbon black and graphite. Examples of the preferred binder include polytetrafluoroethylene and polyvinylidene fluoride.

The secondary battery produced by using the positive electrode active substance according to the present invention comprises the above positive electrode, a negative electrode (anode) and an electrolyte.

Examples of a negative electrode (anode) active substance which may be used for production of the negative electrode include metallic lithium, lithium/aluminum alloys, lithium/tin alloys, and graphite or black lead.

Also, as a solvent for the electrolyte solution, there may be used combination of ethylene carbonate and diethyl carbonate, as well as an organic solvent comprising at least one compound selected from the group consisting of carbonates such as propylene carbonate and dimethyl carbonate, and ethers such as dimethoxyethane.

Further, as the electrolyte, there may be used a solution prepared by dissolving lithium phosphate hexafluoride or otherwise at least one lithium salt selected from the group consisting of lithium perchlorate and lithium borate tetrafluoride in the above solvent.

<Function>

In order to improve characteristics of the secondary battery, it is important to suppress deterioration or degradation of the surface of the lithium composite compound particles forming the positive electrode active substance thereof. In particular, in order to improve the high-temperature storage property of the secondary battery, etc., it is important how to suppress generation of gasses within the secondary battery.

The impurities being present within the secondary battery tend to have an adverse influence on various characteristics thereof. In particular, the lithium raw materials added in an excess amount upon the reaction and synthesis of the lithium composite compound particles tend to remain in an unreacted state on the surface of the resulting particles to thereby cause a further adverse influence upon producing the secondary battery. In addition, if lithium oxide and lithium hydroxide act as a strong alkali, gelation of the particles upon formation of a coating material tends to occur, or the coating material tends to be deteriorated in storage property. Also, if lithium carbonate is formed, generation of gases tends to occur upon charging within the secondary battery, thereby exerting an adverse influence on cycle characteristics and storage property of the resulting secondary battery. Further, if lithium is present in the form of lithium sulfate on the surface of the respective particles, the resulting secondary battery tends to suffer from increase in impedance upon storage and as a result, tends to be deteriorated in cycle characteristics.

In order to suppress occurrence of the above drawbacks, it is required that residual amounts of the surplus lithium, the sulfate component and the carbonate component in the particles are reduced to as small a level as possible.

However, the nickel-based positive electrode active substance such as $LiNiO_2$ tends to undergo release of lithium even from an inside of the particles when contacted with water, thereby starting breakage of a crystal structure from the surface of the respective particles.

Under these circumstances, in the present invention, in order to suppress occurrence of the above phenomenon, the particles are washed to such an extent as to reduce only a surplus amount of the respective components, and subjected to heat treatment in an atmosphere of decarbonated air or decarbonated oxygen to control surface properties of the particles. As a result, it is possible to obtain the lithium composite compound particles which have a less content of residual salts such as the surplus lithium and are well controlled in specific surface area and crystallinity.

If the washing conditions are inadequate, components being present on the surface of the respective particles tend to be partially formed into low-valence components which tend to be dissolved out upon charging and discharging and deposited on the negative electrode, so that there tends to arise such a problem that the thus deposited components tend to act as a resistance component upon desorption and insertion of Li, or cycle characteristics of the resulting battery tend to be deteriorated. To solve these problems, according to the present invention, the surface conditions of the lithium composite compound particles are suitably controlled by measuring ionic strengths of impurities thereon using a time-of-flight secondary ion mass spectrometer (TOF-SIMS), reducing the amounts of the impurities being present on the surface of the respective particles, and stabilizing a crystallinity of the surface of the respective particles. As a result, it is possible to provide a positive electrode active substance for a secondary battery which has good cycle characteristics and an excellent high-temperature storage property.

EXAMPLES

Typical examples of the present invention are described in more detail below.

The obtained product was identified using a powder X-ray diffractometer (manufactured by RIGAKU Co., Ltd.; Cu—Kα; 40 kV; 40 mA).

The elemental analysis was carried out using a plasma emission spectroscopic device ("SPS 4000" manufactured by Seiko Denshi Kogyo Co., Ltd.).

The average primary particle diameter of the particles was determined using a scanning electron microscope "SEM-EDX" equipped with an energy disperse type X-ray analyzer (manufactured by Hitachi High-Technologies Corp.).

The average secondary particle diameter (D50) of the particles was expressed by a volume-median particle diameter as measured by a wet laser method using a laser type particle size distribution measuring apparatus "LMS-30" manufactured by Seishin Kigyo Co., Ltd.

The condition of existence of the particles which are coated or allowed to be present on core particles was observed using a scanning electron microscope "SEM-EDX" equipped with an energy disperse type X-ray analyzer (manufactured by Hitachi High-Technologies Corp.) and a time-of-flight secondary ion mass spectrometer "TOF-SIMS5" (manufactured by ION-TOF Inc.) to calculate an ionic strength ratio A ($LiO^-/NiO_2^-$), an ionic strength ratio B ($Li_3CO_3^+/Ni^+$) and an ionic strength ratio C ($LiSO_3^-/NiO_2^-$) thereof.

The powder pH value of the particles was determined as follows. That is, 0.5 g of the particles was suspended in 25 mL of distilled water to prepare a 2 wt % dispersion, and then the resulting dispersion was allowed to stand at room temperature to measure a pH value thereof.

The carbon content of the particles was determined as follows. That is, a sample was burnt in an oxygen flow in a combustion furnace to measure a carbon content thereof using a carbon/sulfur measuring apparatus "EMIA-520" manufactured by Horiba Seisakusho Co., Ltd.

The sulfur content of the particles was determined as follows. That is, a sample was burnt in an oxygen flow in a combustion furnace to measure a sulfur content thereof using a carbon/sulfur measuring apparatus "EMIA-520" manufactured by Horiba Seisakusho Co., Ltd.

The sodium content of the particles was determined using a plasma emission spectroscopic device ("SPS 4000" manufactured by Seiko Denshi Kogyo Co., Ltd.).

The contents of a lithium carbonate component and lithium hydroxide were determined as follow. That is, 20 g of a sample were suspended in 100 mL of deionized water in a conical flask, and after hermetically sealing the flask with in an argon (Ar) atmosphere, the resulting suspension was stirred for 20 min using a magnetic stirrer to extract a surplus amount of lithium carbonate and lithium hydroxide in a solvent. The obtained extract was subjected to suction filtration to separate the extract into the sample and a filtrate. The thus obtained filtrate was subjected to titration using hydrochloric acid. The terminal point of the titration was determined using phenolphthalein and Bromocresol Green Methyl as indicators, and the amounts of lithium carbonate and lithium hydroxide in the sample were estimated from titers to determine surplus amounts of the respective components.

The BET specific surface area of the particles was measured by BET method using nitrogen.

The battery characteristics of the positive electrode active substance were determined as follows. That is, the positive electrode, negative electrode and electrolyte solution were produced by the following methods, and a coin cell was produced therefrom to evaluate the battery characteristics of the positive electrode active substance.

<Production of Positive Electrode>

The positive electrode active substance, acetylene black as a conducting agent and polyvinylidene fluoride as a binder were accurately weighed such that a weight ratio therebetween was 85:10:5, and fully mixed with each other in a mortar. Then, the resulting mixture was dispersed in N-methyl-2-pyrrolidone to prepare a positive electrode preparation slurry. Next, the thus prepared slurry was applied on an aluminum foil as a current collector to form a coating layer having a thickness of 150 μm, and dried in vacuum at 150° C. The thus obtained coated foil was blanked into a disk shape having a diameter of 16 mmϕ to produce a positive electrode plate.

<Production of Negative Electrode>

A metallic lithium foil was blanked into a disk shape having a diameter of 16 mmϕ to produce a negative electrode.

<Preparation of Electrolyte Solution>

A mixed solution was prepared by mixing ethylene carbonate and diethyl carbonate with each other at a volume ratio of 50:50, and 1 mol/L of lithium phosphate hexafluoride ($LiPF_6$) was mixed in the mixed solution to prepare an electrolyte solution.

<Assembly of Coin Cell>

In a glove box placed in an argon atmosphere, the above positive electrode and negative electrode were disposed in a SUS316 casing through a polypropylene separator, and the electrolyte solution was filled in the casing to produce a coil cell of CR2032 type.

<Evaluation of Battery>

The coin cell thus produced was subjected to charge/discharge test for secondary batteries. The measuring conditions were as follows. That is, the coin cell was repeatedly subjected to charging and discharging cycles at rate of 1.0 C at a cut-off voltage between 3.0 V and 4.3 V. The charging and discharging cycle at a rate of 1.0 C is completed for a short period of time as compared to the charging and discharging cycle at a rate of 0.2 C, etc., (the cycle time at 1 C is 1 hr whereas the cycle time at 0.2 C is 5 hr), i.e., the charging and discharging cycle at a rate of 1.0 C is carried out at a large current density.

Swelling of the battery was determined as follows. That is, a 500 mAh laminated type cell was produced using a carbon negative electrode. The cell was charged until reaching 4.2 V and stored at 85° C. for 24 hr to measure volumes of the coin cell before and after being stored and calculate a rate of change in volume therebetween.

The increase in resistance of the coin cell was determined as follows. That is, the coin cell was charged until reaching 4.3 V and stored at 60° C. for 4 weeks to measure AC impedance values before and after being stored and calculate a rate of increase in resistance of the cell. The measurement of the impedance values was carried out using an AC impedance measuring device constructed of a 1287-type interface and a 1252A type frequency response analyzer both manufactured by Solartron Co., Ltd.

Example 1

A hydroxide of cobalt, nickel and aluminum was mixed with lithium hydroxide at such a mixing ratio that a molar ratio of Li/(Ni+Co+Al) was 1.08, and the resulting mixture was calcined at 750° C. in an oxygen atmosphere for 20 hr to thereby obtain lithium composite compound particles. The thus obtained lithium composite compound particles were deaggregated, and 60 g of the deaggregated particles were suspended in 300 mL of deionized water maintained at a water temperature of 10° C. The resulting suspension was stirred for 20 min and then subjected to filtration and washing.

The obtained particles were dried at 120° C. over one night, deaggregated again and then subjected to heat treatment in a decarbonated oxygen atmosphere ($CO_2$ concentration: 20 ppm) at 850° C. for 2 hr.

The thus obtained lithium composite compound particles were evaluated using a time-of-flight secondary ion mass spectrometer. As a result, it was confirmed that the lithium composite compound particles had an ionic strength ratio A ($LiO^-/NiO_2^-$) of 0.04, an ionic strength ratio B ($Li_3CO_3^+/Ni^+$) of 3.8 and an ionic strength ratio C ($LiSO_3^-/NiO_2^-$) of 0.07. The obtained particles were embedded in a resin and then subjected to FIB processing. As a result of observing and analyzing a near-surface portion (FIG. 3) and an inside portion (FIG. 2) of the thus resin-embedded particles by electron diffraction, it was confirmed that any of the portions had a diffraction pattern belonging to R-3m having a high crystallinity.

Example 2

The respective raw materials were mixed with each other at such a mixing ratio that a molar ratio of Li/(Ni+Co+Al) was 1.02, and the resulting mixture was subsequently treated in the same manner as defined in Example 1 to thereby obtain particles. The thus obtained particles were washed, dried and then subjected to heat treatment in a decarbonated oxygen atmosphere ($CO_2$ concentration: 20 ppm) at 800° C. for 2 hr.

Example 3

The respective raw materials were mixed with each other at such a mixing ratio that a molar ratio of Li/(Ni+Co+Al) was 1.02, and the resulting mixture was subsequently treated in the same manner as defined in Example 1 to thereby obtain particles. The thus obtained particles were washed, dried and then subjected to heat treatment in a decarbonated air atmosphere ($CO_2$ concentration: 20 ppm) at 800° C. for 2 hr.

Example 4

A hydroxide of cobalt, nickel and aluminum was mixed with boric acid and lithium hydroxide at such a mixing ratio that a molar ratio of Li/(Ni+Co+Al+B) was 1.07, and the resulting mixture was calcined at 750° C. in an oxygen atmosphere for 20 hr to thereby obtain lithium composite compound particles. The thus obtained lithium composite compound particles were deaggregated, and 60 g of the deaggregated particles were washed in the same manner as defined in Example 1.

The obtained particles were dried at 120° C. over one night, deaggregated again and then subjected to heat treatment in a decarbonated oxygen atmosphere ($CO_2$ concentration: 20 ppm) at 500° C. for 2 hr.

Example 5

The respective raw materials were mixed with each other at such a mixing ratio that a molar ratio of Li/(Ni+Co+Al+B)

was 1.10, and the resulting mixture was subsequently treated in the same manner as defined in Example 4 to thereby obtain particles. The thus obtained particles were washed, dried and then subjected to heat treatment in a decarbonated air atmosphere ($CO_2$ concentration: 20 ppm) at 700° C. for 2 hr.

Example 6

The respective raw materials were mixed with each other at such a mixing ratio that a molar ratio of Li/(Ni+Co+Al+B) was 1.10, and the resulting mixture was subsequently treated in the same manner as defined in Example 4 to thereby obtain particles. The thus obtained particles were washed, dried and then subjected to heat treatment in a decarbonated oxygen atmosphere ($CO_2$ concentration: 20 ppm) at 600° C. for 2 hr.

Comparative Example 1

The same procedure as defined in Example 1 was conducted except that the lithium composite compound particles obtained by the calcination were subjected to no washing treatment. The resulting particles were embedded in a resin and then subjected to FIB processing. As a result of observing and analyzing a near-surface portion of the thus obtained particles by electron diffraction (FIG. 4), it was confirmed that the portion had a diffraction pattern belonging to R-3m having a low crystallinity.

Comparative Example 2

The same procedure as defined in Example 4 was conducted except that the lithium composite compound particles obtained by the calcination were subjected to no washing treatment.

Comparative Example 3

The particles obtained in Example 1 were subjected to neither washing nor drying treatment, and the thus obtained lithium composite compound particles were then subjected to heat treatment in a decarbonated oxygen atmosphere ($CO_2$ concentration: 20 ppm) at 800° C. for 2 hr.

Comparative Example 4

The particles obtained in Example 2 were subjected to washing and drying treatments to obtain lithium composite compound particles, and the thus obtained lithium composite compound particles were then subjected to heat treatment in a decarbonated nitrogen atmosphere ($CO_2$ concentration: 20 ppm) at 600° C. for 2 hr.

Comparative Example 5

The particles obtained in Example 4 were subjected to washing and drying treatments to obtain lithium composite compound particles, and the thus obtained lithium composite compound particles were then subjected to heat treatment in a decarbonated oxygen atmosphere ($CO_2$ concentration: 20 ppm) at 300° C. for 2 hr.

Comparative Example 6

The particles obtained in Example 5 were subjected to washing and drying treatment to obtain lithium composite compound particles, and the thus obtained lithium composite compound particles were then subjected to heat treatment in a decarbonated nitrogen atmosphere (concentration: 20 ppm) at 850° C. for 2 hr.

Comparative Example 7

The particles obtained in Example 5 were subjected to washing and drying treatment to obtain lithium composite compound particles, and the thus obtained lithium composite compound particles were then subjected to heat treatment in a non-decarbonated air atmosphere ($CO_2$ concentration: 350 ppm) at 500° C. for 2 hr.

Comparative Example 8

The particles obtained in Example 5 were subjected to washing and drying treatment to obtain lithium composite compound particles, and the thus obtained lithium composite compound particles were then subjected to heat treatment in a non-decarbonated oxygen atmosphere ($CO_2$ concentration: 350 ppm) at 800° C. for 2 hr. The resulting particles were embedded in a resin and then subjected to FIB processing. As a result of observing and analyzing a near-surface portion of the thus obtained particles by electron diffraction (FIG. 5), it was confirmed that the portion had a diffraction pattern belonging to R-3m having a polycrystalline-like structure.

The production conditions used in the above Examples and Comparative Examples are shown in Table 1, and the compositional ratios and various properties of the resulting lithium composite compound particles are shown in Table 2 and Table 3, respectively.

TABLE 1

| Examples and Comparative Examples | Production conditions | | | | |
|---|---|---|---|---|---|
| | Li/metal elements ratio before washing | Washing treatment Washing with water (—) | Heat treatment | | |
| | | | Temp. (° C.) | Kind | Decarbonation |
| Example 1 | 1.08 | Done | 850 | Oxygen | ○ |
| Example 2 | 1.02 | Done | 800 | Oxygen | ○ |
| Example 3 | 1.02 | Done | 800 | Air | ○ |
| Example 4 | 1.07 | Done | 500 | Oxygen | ○ |
| Example 5 | 1.10 | Done | 700 | Air | ○ |
| Example 6 | 1.10 | Done | 600 | Oxygen | ○ |
| Comparative Example 1 | 1.08 | None | — | — | — |
| Comparative Example 2 | 1.07 | None | — | — | — |
| Comparative Example 3 | 1.08 | None | 800 | Oxygen | ○ |
| Comparative Example 4 | 1.02 | Done | 600 | Nitrogen | ○ |
| Comparative Example 5 | 1.07 | Done | 300 | Oxygen | ○ |
| Comparative Example 6 | 1.10 | Done | 850 | Nitrogen | ○ |
| Comparative Example 7 | 1.10 | Done | 500 | Air | X |
| Comparative Example 8 | 1.10 | Done | 800 | Oxygen | X |

TABLE 2

| Examples and Comparative Examples | Compositional ratio $Li_{1+x}Ni_{1-y-z1-z2}Co_yM1_{z1}M2_{z2}O_2$ | | | | | | Compositional formula |
|---|---|---|---|---|---|---|---|
| | x | y | M1 | z1 | M2 | z2 | |
| Example 1 | −0.02 | 0.15 | Al | 0.05 | — | — | $Li_{0.98}Ni_{0.80}Co_{0.15}Al_{0.05}O_2$ |
| Example 2 | 0.01 | 0.15 | Al | 0.05 | — | — | $Li_{1.01}Ni_{0.80}Co_{0.15}Al_{0.05}O_2$ |
| Example 3 | 0.01 | 0.15 | Al | 0.05 | — | — | $Li_{1.01}Ni_{0.80}Co_{0.15}Al_{0.05}O_2$ |
| Example 4 | 0.00 | 0.15 | Al | 0.04 | B | 0.01 | $Li_{1.00}Ni_{0.80}Co_{0.15}Al_{0.04}B_{0.01}O_2$ |
| Example 5 | −0.01 | 0.15 | Al | 0.04 | B | 0.01 | $Li_{0.99}Ni_{0.80}Co_{0.15}Al_{0.04}B_{0.01}O_2$ |
| Example 6 | 0.02 | 0.15 | Al | 0.04 | B | 0.01 | $Li_{1.02}Ni_{0.80}Co_{0.15}Al_{0.04}B_{0.01}O_2$ |
| Comparative Example 1 | 0.08 | 0.15 | Al | 0.05 | — | — | $Li_{1.08}Ni_{0.80}Co_{0.15}Al_{0.05}O_2$ |
| Comparative Example 2 | 0.07 | 0.15 | Al | 0.04 | B | 0.01 | $Li_{1.07}Ni_{0.80}Co_{0.15}Al_{0.04}B_{0.01}O_2$ |
| Comparative Example 3 | 0.07 | 0.15 | Al | 0.05 | — | — | $Li_{1.07}Ni_{0.80}Co_{0.15}Al_{0.05}O_2$ |
| Comparative Example 4 | 0.00 | 0.15 | Al | 0.05 | — | — | $Li_{1.00}Ni_{0.80}Co_{0.15}Al_{0.05}O_2$ |
| Comparative Example 5 | 0.04 | 0.15 | Al | 0.04 | B | 0.01 | $Li_{1.04}Ni_{0.80}Co_{0.15}Al_{0.04}B_{0.01}O_2$ |
| Comparative Example 6 | 0.03 | 0.15 | Al | 0.04 | B | 0.01 | $Li_{1.03}Ni_{0.80}Co_{0.15}Al_{0.04}B_{0.01}O_2$ |
| Comparative Example 7 | 0.02 | 0.15 | Al | 0.04 | B | 0.01 | $Li_{1.02}Ni_{0.80}Co_{0.15}Al_{0.04}B_{0.01}O_2$ |
| Comparative Example 8 | 0.02 | 0.15 | Al | 0.04 | B | 0.01 | $Li_{1.02}Ni_{0.80}Co_{0.15}Al_{0.04}B_{0.01}O_2$ |

TABLE 3

| Examples and Comparative Examples | Surface condition data: ionic strength ratios TOF-SIMS | | | Properties | | | Surplus components | | | |
|---|---|---|---|---|---|---|---|---|---|---|
| | $LiO^-/NiO_2^-$ (—) | $Li_3CO_3^+/Ni^+$ (—) | $LiSO_3^-/NiO_2^-$ (—) | D50 (μm) | BET (m²/g) | Powder pH (—) | Carbon content (ppm) | Sulfur content (ppm) | Sodium content (ppm) | LiOH (wt %) | $Li_2CO_3$ (wt %) |
| Example 1 | 0.04 | 3.8 | 0.07 | 13.1 | 0.07 | 10.5 | 185 | 40 | <5 | 0.09 | 0.10 |
| Example 2 | 0.14 | 12.9 | 0.03 | 12.6 | 0.11 | 10.7 | 218 | 10 | <5 | 0.18 | 0.16 |
| Example 3 | 0.18 | 16.4 | 0.05 | 13.0 | 0.08 | 10.7 | 194 | 18 | <5 | 0.17 | 0.16 |
| Example 4 | 0.14 | 7.3 | 0.04 | 12.5 | 0.52 | 10.7 | 106 | 5 | 12 | 0.13 | 0.10 |
| Example 5 | 0.07 | 8.2 | 0.07 | 12.7 | 0.16 | 10.6 | 129 | 7 | <5 | 0.14 | 0.11 |
| Example 6 | 0.22 | 19.4 | 0.06 | 12.6 | 0.42 | 10.8 | 181 | 9 | <5 | 0.19 | 0.17 |
| Comparative Example 1 | 2.45 | 103.4 | 1.05 | 12.8 | 0.12 | 11.4 | 451 | 703 | 231 | 0.40 | 0.31 |
| Comparative Example 2 | 1.37 | 201.7 | 0.55 | 12.2 | 1.33 | 11.2 | 380 | 530 | 320 | 0.41 | 0.33 |
| Comparative Example 3 | 2.25 | 98.2 | 1.04 | 12.9 | 0.09 | 11.3 | 435 | 701 | 240 | 0.41 | 0.30 |
| Comparative Example 4 | 0.37 | 12.4 | 0.13 | 12.5 | 0.33 | 10.6 | 188 | 62 | <5 | 0.17 | 0.15 |
| Comparative Example 5 | 0.52 | 25.8 | 0.12 | 12.4 | 0.87 | 10.8 | 240 | 45 | 12 | 0.34 | 0.33 |
| Comparative Example 6 | 0.52 | 22.1 | 0.04 | 12.5 | 0.09 | 10.8 | 265 | <5 | <5 | 0.28 | 0.22 |
| Comparative Example 7 | 0.19 | 44.3 | 0.07 | 12.5 | 0.63 | 10.9 | 380 | <5 | <5 | 0.33 | 0.31 |
| Comparative Example 8 | 0.28 | 67.3 | 0.05 | 12.3 | 0.11 | 10.9 | 257 | <5 | <5 | 0.24 | 0.28 |

TABLE 3-continued

|  | Battery evaluation data | | |
| --- | --- | --- | --- |
|  | Cycle | Storage property | |
| Examples and Comparative Examples | characteristics Retention rate (%) | Swelling (%) | Increase in resistance (%) |
| Example 1 | 97 | 15 | 40 |
| Example 2 | 98 | 15 | 45 |
| Example 3 | 97 | 17 | 65 |
| Example 4 | 98 | 18 | 45 |
| Example 5 | 97 | 10 | 30 |
| Example 6 | 98 | 10 | 35 |
| Comparative Example 1 | 91 | 50 | 185 |
| Comparative Example 2 | 92 | 45 | 170 |
| Comparative Example 3 | 92 | 48 | 150 |
| Comparative Example 4 | 85 | 22 | 40 |
| Comparative Example 5 | 94 | 50 | 115 |
| Comparative Example 6 | 82 | 24 | 65 |
| Comparative Example 7 | 85 | 44 | 95 |
| Comparative Example 8 | 86 | 47 | 95 |

The resulting lithium composite compound particles (Example 1 and Comparative Examples 1 and 8) were respectively embedded in a resin and then subjected to FIB processing. Thereafter, the lithium composite compound particles were subjected to nano-ED (electron diffraction) as shown in FIG. 1 to determine the conditions of a near-surface portion (B in FIG. 1) and an inside portion (A in FIG. 1) of the particles. As a result, it was confirmed that a central portion of any of the sample particles maintained a good crystallinity (FIG. 2).

As shown in FIG. 4, it was expected that the untreated particles (Comparative Example 1) had a poor crystallinity on the surface thereof so that movement of lithium therein was inhibited. Also, as shown in FIG. 5, it was confirmed that the particles subjected to the heat treatment but treated in a non-decarbonated atmosphere (Comparative Example 8) had a polycrystalline-like structure although they were improved in crystallinity as compared to those of Comparative Example 1. In addition, as shown in FIG. 3, it was confirmed that the particles subjected to the heat treatment in a decarbonated atmosphere (Example 1) were improved in crystallinity, and the battery produced using the particles were also improved in cycle characteristics.

Thus, the secondary batteries produced using the lithium composite compound particles according to the present invention had good battery characteristics such as a cycle retention rate of not less than 95%, and good storage properties such as a cell swelling rate as low as not more than 20% and further a rate of increase in resistance as low as not more than 70%.

INDUSTRIAL APPLICABILITY

The lithium composite compound particles according to the present invention are excellent in cycle characteristics and high-temperature storage property required as a positive electrode active substance for secondary batteries, and can be therefore suitably used as the positive electrode active substance for secondary batteries.

Figure 1:
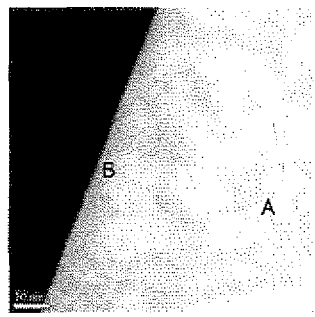
FIG. 1 is an electron micrograph showing an observation position of a section of respective lithium composite compound particles according to the present invention in which A indicates a central portion of the particles whereas B indicates a surface portion of the particles.
Figure 2:
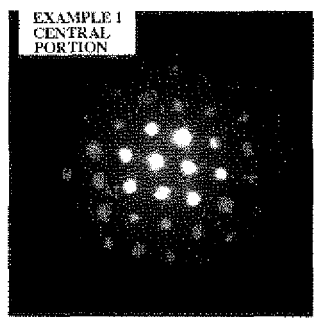
FIG. 2 is an electron diffraction microphotograph showing a central portion of the lithium composite compound particles obtained in Example 1.
Figure 3:
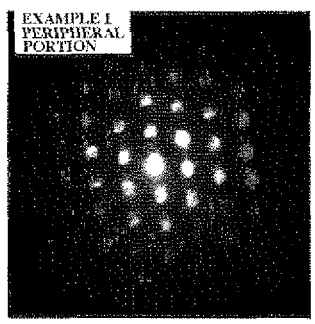
FIG. 3 is an electron diffraction microphotograph showing a surface portion of the lithium composite compound particles obtained in Example 1.
Figure 4:
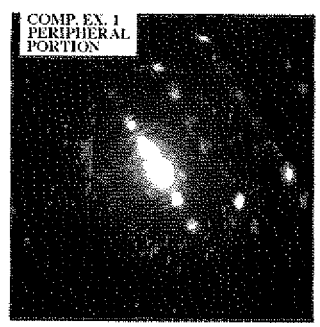
FIG. 4 is an electron diffraction microphotograph showing a surface portion of the lithium composite compound particles obtained in Comparative Example 1.
Figure 5:
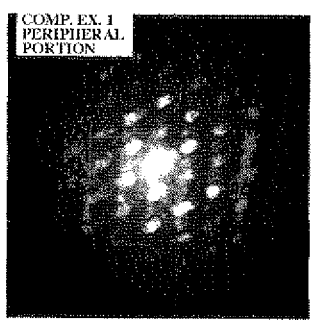
FIG. 5 is an electron diffraction microphotograph showing a surface portion of the lithium composite compound particles obtained in Comparative Example 8.

The invention claimed is:

1. A process for producing the lithium composite compound particles comprising a lithium composite compound represented by the following compositional formula 1, which lithium composite compound particles have an ionic strength ratio A ($LiO^-/NiO_2^-$) of not more than 0.3 and an ionic strength ratio B ($Li_3CO_3^+/Ni^+$) of not more than 20 as measured on a surface of the respective lithium composite compound particles using a time-of-flight secondary ion mass spectrometer:

  Compositional formula 1 wherein M is at least one element selected from the group consisting of B and Al; and x, y and z satisfy $-0.02 \leq x \leq 0.02$, $0 < y \leq 0.20$ and $0 < z \leq 0.10$, respectively, the process comprising the steps of (1) treating lithium composite compound particles with a water solvent to remove impurities therefrom; and (2) subjecting the lithium composite compound particles obtained in the step (1) to drying and then to heat treatment in a temperature range of 500 to 850° C. in an air or oxygen atmosphere having a carbon dioxide concentration of not more than 100 ppm, wherein a ratio of a total molar amount of lithium to a total molar amount of a transition element, aluminum and boron in the lithium composite compound particles used in the step (1) being not less than 1.02 and not more than 1.10.

2. A process according to claim 1, wherein the heat treatment is conducted in a temperature range of 600 to 850° C.

* * * * *